(12) United States Patent  
Takahashi

(10) Patent No.: US 6,529,918 B2  
(45) Date of Patent: Mar. 4, 2003

(54) FILE SYSTEM

(75) Inventor: Hiroshi Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/316,363

(22) Filed: May 21, 1999

(65) Prior Publication Data

US 2002/0023071 A1 Feb. 21, 2002

(30) Foreign Application Priority Data

Jul. 14, 1998 (JP) .......................................... 10-198631

(51) Int. Cl.[7] .............................................. G06F 17/30
(52) U.S. Cl. ................... 707/205; 707/104.1; 358/1.13; 358/1.16; 358/1.6
(58) Field of Search ............................... 358/1.15, 1.9, 358/1.16, 1.13, 1.12; 711/162; 710/5; 714/6, 722; 345/156, 593, 545, 601, 215; 703/23; 707/101, 104.1, 205

(56) References Cited

U.S. PATENT DOCUMENTS

| | | | | |
|---|---|---|---|---|
| 5,392,135 A | * | 2/1995 | Amemiya | 358/444 |
| 5,488,485 A | * | 1/1996 | Amemiya | 358/444 |
| 5,572,499 A | * | 11/1996 | Kohtani et al. | 369/83 |
| 5,574,834 A | * | 11/1996 | Horie et al. | 358/1.15 |
| 5,764,866 A | * | 6/1998 | Maniwa | 358/1.15 |
| 5,946,457 A | * | 8/1999 | Nakai et al. | 358/1.13 |
| 6,069,706 A | * | 5/2000 | Kajita et al. | 358/1.15 |
| 6,226,099 B1 | * | 5/2001 | Sugaya | 358/1.16 |
| 6,226,102 B1 | * | 5/2001 | Koike et al. | 358/1.9 |

FOREIGN PATENT DOCUMENTS

| | | |
|---|---|---|
| JP | 5-35737 | 2/1993 |
| JP | 6-119393 | 4/1994 |

* cited by examiner

*Primary Examiner*—John Breene  
*Assistant Examiner*—Mohammad Ali  
(74) *Attorney, Agent, or Firm*—Oblon, Spivak, McClelland, Maier & Neustadt, P.C.

(57) ABSTRACT

According to the a processing command for the copy function or the like, the copying machine sends the processing conditions like the user ID or the coping density as appended data along with the document data to the server through the Intranet. The server 12 accumulates the document data in the infinite memory server and Web IMS and simultaneously stores the accumulated addresses and other appended data in relation to each of the user IDs in a retrieval possible way in the database inside the hard disk drive. When the document data is to be reused, the server displays the appended data so that it can be easily selected and sends the selected appended data along with the document data to the copying machine.

6 Claims, 20 Drawing Sheets

| 26H | REGISTERED NUMBER DATA |
|-----|------------------------|
| 27H | DOUBLE-SIDED MODE (DATA) |
| 28H | DIVISION MODE (DATA) |
| 29H | INTENSIVE MODE (DATA) |
| 2AH | PRINT MODE (DATA) |

| 31H | FEED PAPER POSITION DATA |
|-----|--------------------------|
| 32H | AUTO-DENSITY SELECTION MODE |
| 33H | DENSITY SETTING DATA |
| 34H | EDIT MODE (DATA) |
| 35H | SIZE CHANGE MODE (DATA) |

FIG. 15

| YEAR ○ ○○○○ | Calendar | | RETRIEVAL 60 | SCREEN-OUT | CALL | 59 ⇓↑↓⇐ |
|---|---|---|---|---|---|---|
| | | | 64 61 | 65 | 62 | |

| MONTH ○ | | | | | | |
|---|---|---|---|---|---|---|
| SUNDAY | MONDAY | TUESDAY | WEDNESDAY | THURSDAY | FRIDAY | SATURDAY |
| 26 | 27 | 28 ☐☐☐☐ | 29 | 30 | 31 | |
| 2 | 3 ▦▦ | 4 | 5 ☐ | 6 | 7 ☐☐☐☐ | 8 |
| 9 | 10 ☐☐☐ | 11 | 12 | 13 | 14 ☐☐☐☐ | 15 |
| 16 | 17 ☐☐☐☐ | 18 ☐☐☐☐ ☐☐ | 19 | 20 | 21 | 22 |
| 23 | 24 | 25 | 26 ☐☐☐ | 27 ☐☐☐☐ | 28 ☐ | 29 |
| 30 | | | | | | |

| MONTH ○ | | | | | | |
|---|---|---|---|---|---|---|
| SUNDAY | MONDAY | TUESDAY | WEDNESDAY | THURSDAY | FRIDAY | SATURDAY |
| | 1 | 2 | 3 | 4 | 5 | 6 |
| 7 | 8 | 9 | 10 | 11 | 12 | 13 |

FIG.17

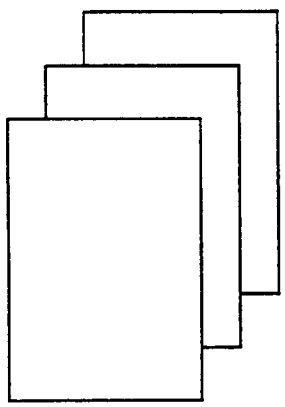
FIG.22A
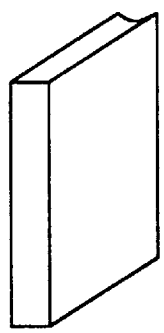
FIG.22B
FIG.23
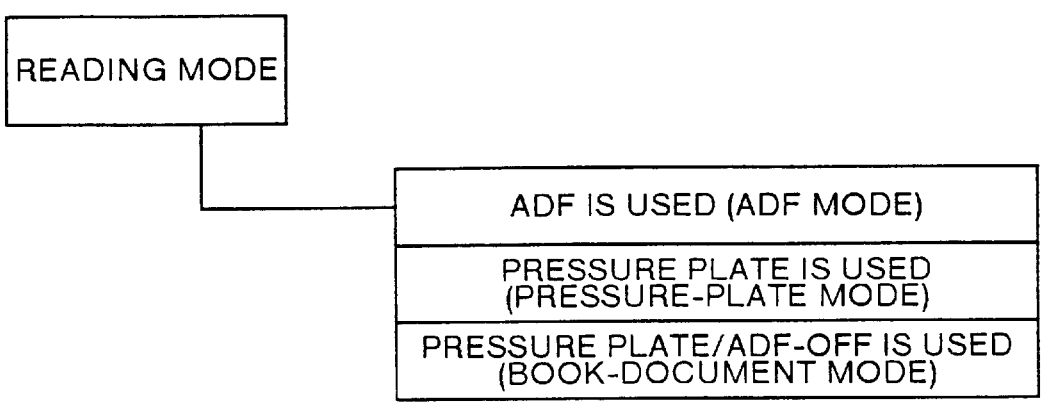

FILE SYSTEM

FIELD OF THE INVENTION

The present invention relates to a file system and more particularly, to a file system which can be applied to a processing system for copying a document image, can back up image data to be copied and further can easily read out desired data.

BACKGROUND OF THE INVENTION

Conventionally, important documents (with images or characters displayed thereon) or documents which may be of use in the future are printed on a paper and the papers are filed in a book shelf or some other place. However, in business offices or other similar places where a vast quantity of documents are treated, a large space is required for storage of the documents, and also a long time is required for finding out a desired document.

In recent years, in association with sophistication and the tendency for a higher data processing speed in the data processing technology and also in association with advent of low priced storage units, a file system has appeared in which documents required to be stored are scanned with a scanner and the data is accumulated in a large capacity storage unit. Such a file system has been introduced not only into business offices but into other facilities also.

As this type of file system there is one in which documents are systematically classified according to their type and stored in a database so that related document can easily be retrieved. Recently, more sophisticated file systems of various types each with further improved convenience in use have been proposed. As the conventional technology, for instance, there are those disclosed in Japanese Patent Laid-Open Publication No. HEI 5-35737 and Japanese Patent Laid-Open Publication No. HEI 6-119393.

However, with the file systems based on the conventional technology as described above it is necessary to scan each document with a scanner. Therefore, if each document is not processed on time the work needs to be done afterwards and many documents to be scanned get piled up. To put the piled documents into order it is necessary to scan each document that is required to be stored with a scanner and to execute a work for inputting data for classification. Even if it is tried to execute a filing work of a bunch of documents at one time all together, because the work is very complicated, there is a tendency of just reducing the number of documents to be stored.

The documents to be stored in a file system are selected because of their importance. If a document is abolished and not stored just because the work is complicated as explained above, the document can never be obtained even if it becomes necessary later.

Therefore, when each document is checked for its necessity of storage, as the determination is not always easy for every document, a long time is required for this work. Furthermore, there is a possibility that a document once decided as not required may become useful in the future.

Documents stored in a file system include copied documents to be used in a conference, those transmitted to or received from business partners through a facsimile machine, or those prepared with a workstation (WS) or a personal computer (PC) and printed therefrom. In brief, a document to be stored is converted to an electric signal at least once and then printed on a paper.

The present inventor decided to solve the problems in file systems based on the conventional technology. They closely checked the process up to storage of each document in the file systems, gave a thought on the usage of this document data, and succeeded in solving the problems in the conventional technology by applying a result of their strenuous studies.

SUMMARY OF THE INVENTION

It is an object of the present invention to provide a file system with enhanced usability. This is achieved by accumulating the same image data that is obtained when a document is copied, providing a method for easily retrieving the image data that a user desires to reuse, and using this image data which is once processed whenever required.

In accordance with the present invention, when an image data is read out from a document by using a copying function of the main body of a processing unit and recorded/outputted (copied) this image data along with the reading modes such as automatic paper feeding and manual placement of a document is accumulated in the memory. This image data stored in the memory is used when required by reading it out. Thus, even if a document that is once copied is lost, for example, the image data having been stored in the memory can be acquired again for printing. Therefore, the image data having been processed can easily be used as required which allows usability thereof to be enhanced.

Other objects and features of this invention will become apparent from the following description with reference to the accompanying drawings.

BRIEF DESCRIPTION OF THE DRAWINGS

FIG. 15 is a display screen showing the processing for referring to the filed data;

FIG. 17 is a display screen showing the processing for referring to the filed data;

FIGS. 22A and 22B are enlarged views of a reduced image appearing on the display screen as another form; and FIG. 23 is a flow diagram with a list for explaining the reference processing.

DESCRIPTION OF THE PREFERRED EMBODIMENTS

Description is made hereinafter for the present invention with reference to the related drawings.

FIG. 1 to FIG. 23 are views showing one embodiment of the file system according to the present invention.

Figure 1:
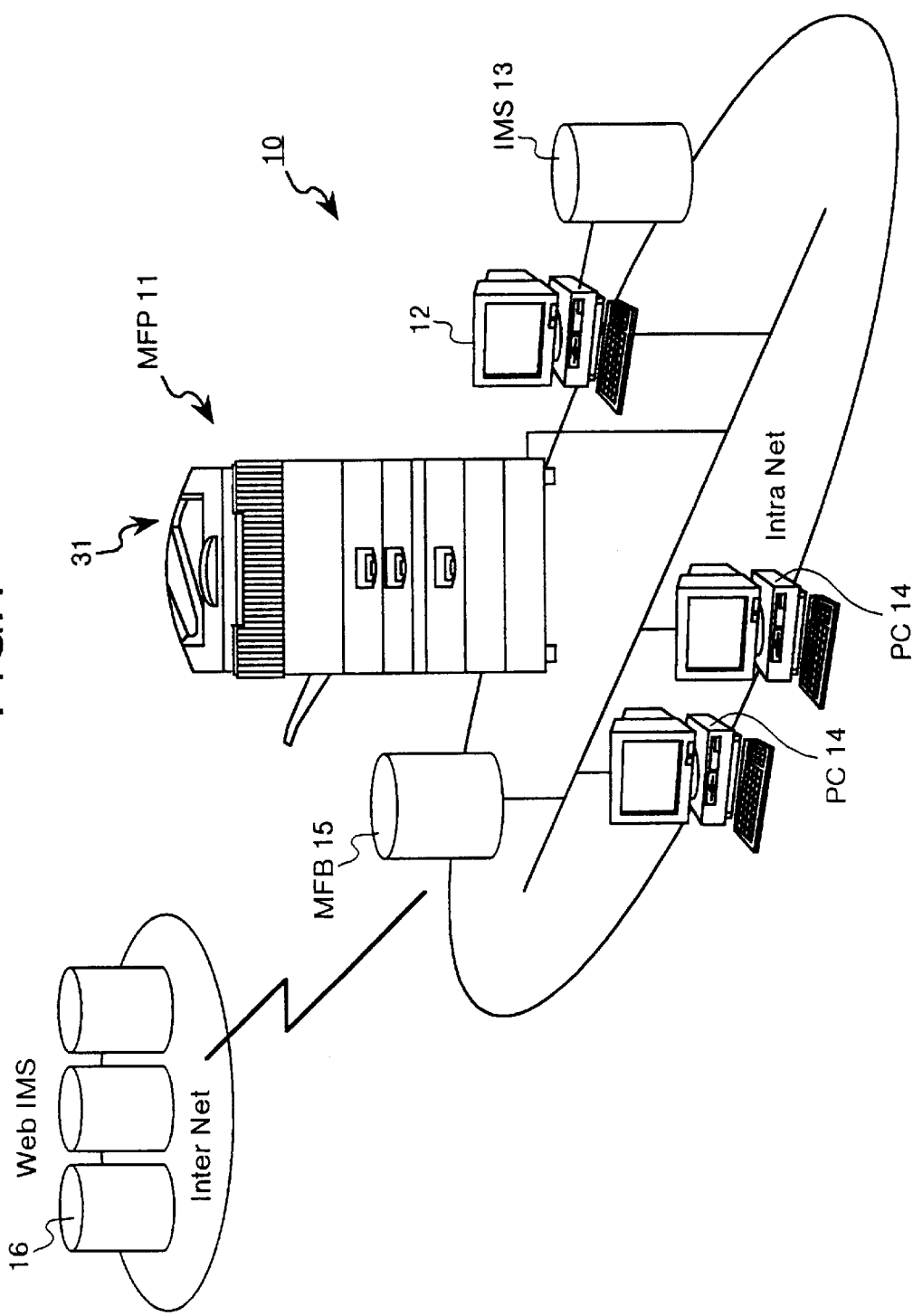
FIG. 1 is a view showing one embodiment of a file system functioning according to a program stored in a storage medium and shows the entire configuration thereof.

The reference numeral 10 in FIG. 1 indicates a data management system constructed for making the effective use of data. This data management system 10 functions as a data backup system for saving backup copies of data handled by a user and also functions as a file system as required by the user so that data can be reused. The data management system 10 comprises a multi-functional printer (MFP) 11 (hereafter, copying machine 11) which is a high functional copying machine placed in the office of the user and connected to the intranet, a server 12, an infinite memory server (IMS) 13, personal computer/s (PC/s) 14, a multi-functional box (MFB) 15 and a Web IMS 16 in a service provider for providing services on the Internet described later.

Figure 2:
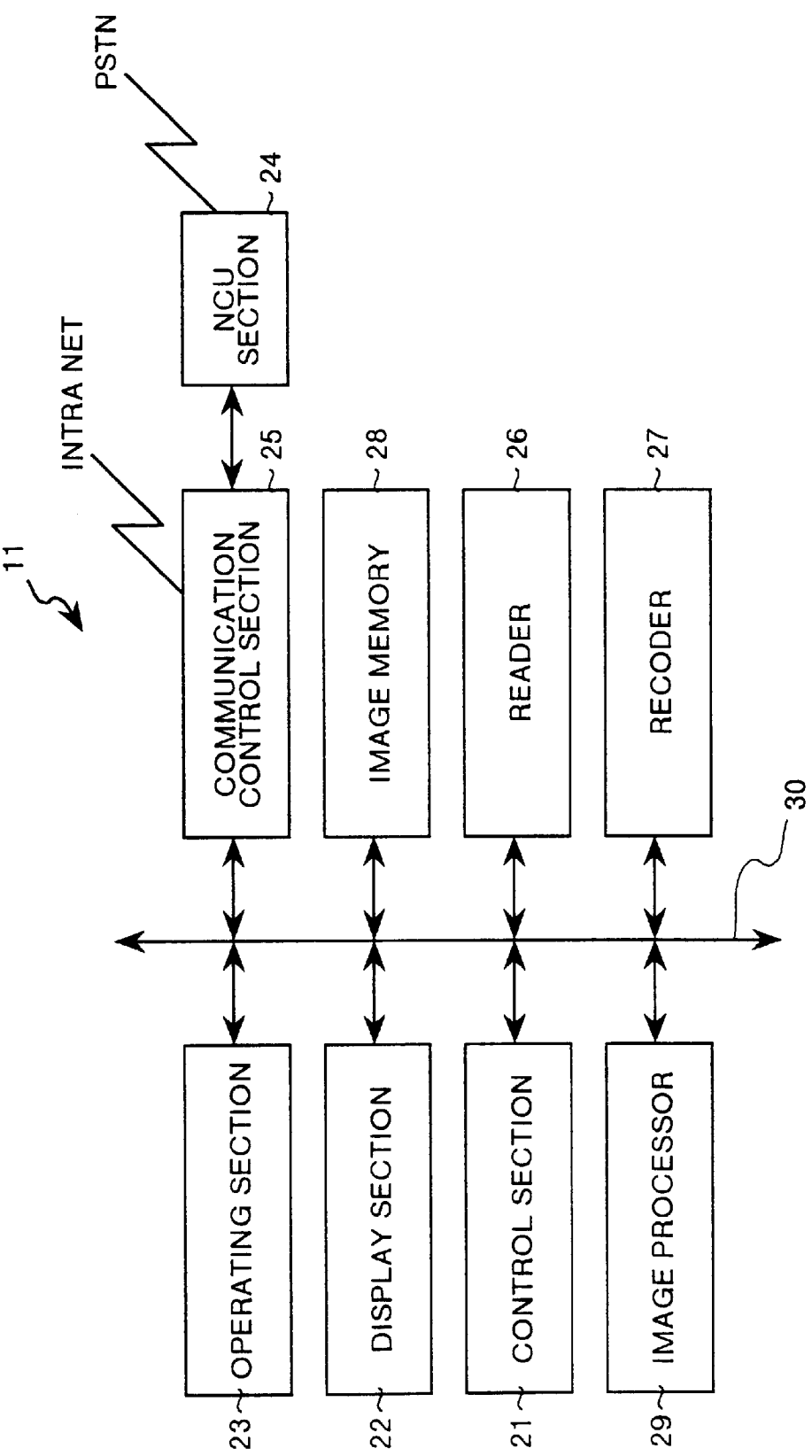
FIG. 2 is a block diagram showing the configuration of a processor in the file system of the present invention.

In the copying machine 11, as shown in FIG. 2, a control section 21 for integrally controlling each section of the device is connected with a display section 22, an operating section 23, an NCU section (Network Control Unit) 24, a communication control section 25, a reader 26, a recorder 27, an image memory 28, and an image processor 29 through a bus 30. In this control section 21, a built-in CPU (Central Processing Unit) executes the operations and each of the functions described later by reading out a control program stored in a RAM (Random Access Memory) and by using a RAM (Random Access Memory) for storing the various information such as the driving conditions of each section of the device or the management data as well as any data required for processing.

Figure 3:
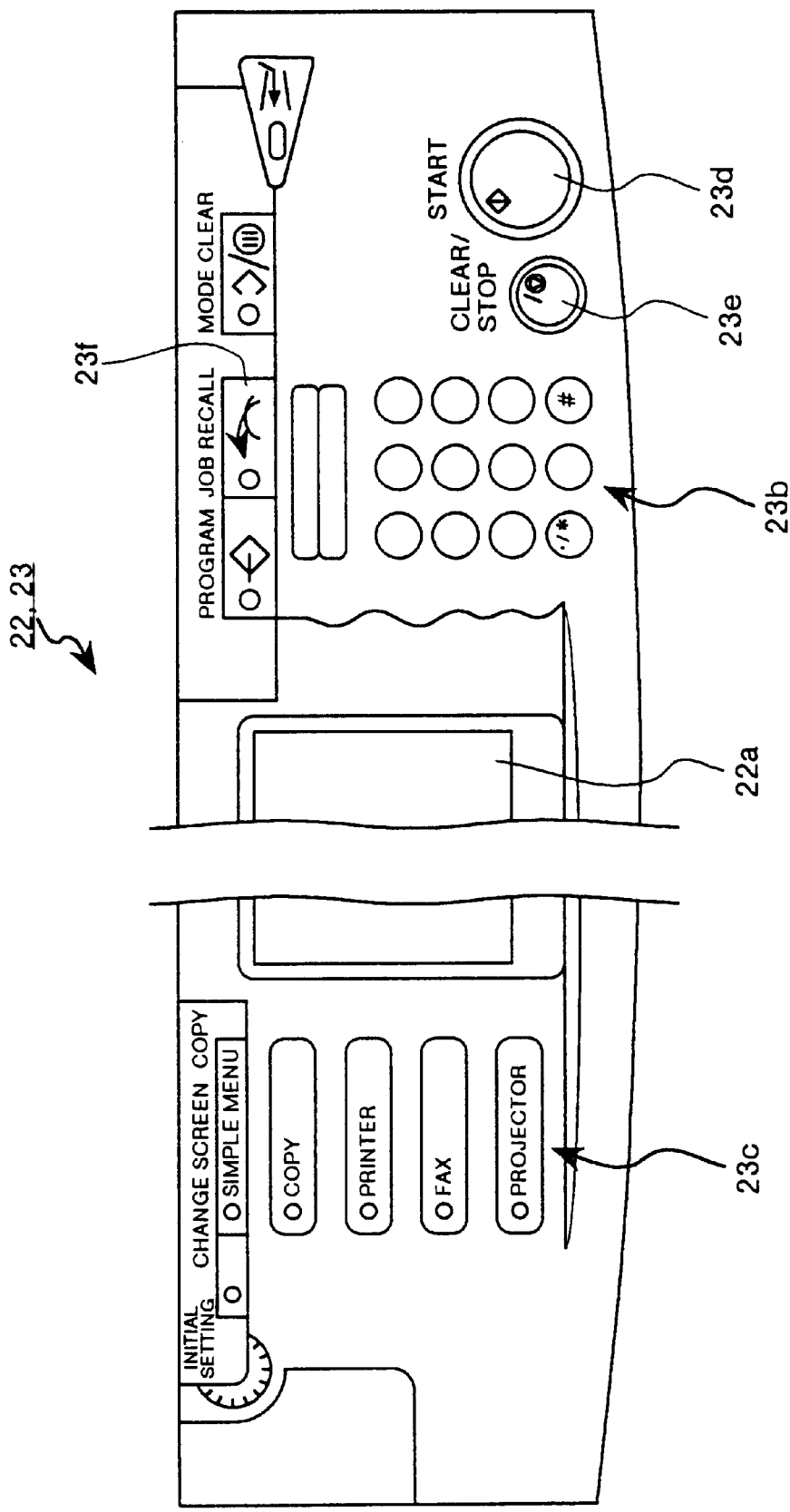
FIG. 3 is a plane view of a display unit and an operating unit in the file system of the present invention.

As shown in FIG. 3, the display section 22 and operating section 23 are integrated in an operation display panel provided on the top front side of the main body of the device. A display operating LCD (Liquid Crystal Display) 22a with a touch panel for displaying the driving conditions, a status of the device, or various information such as input information and inputting data for setting or instructions by a user; a ten-key 23b; function keys (F keys) 23c; a start key 23d; a stop key 23e; and a job recall button 23f are provided on the operation display panel. Thought not illustrated, but there is also provided a slot for setting an ID card to read data from and write data in the ID card is arranged thereon.

The communication control section 25 is connected to the NCU section (Network Control Unit) 24 for connecting or disconnecting a line by executing prespecified line control when a call is transmitted and received through a PSTN (Public Switched Telephone Network). The communication control section 25 modulates or demodulates image data and various sequential signals with a built-in modem, executes facsimile communications (data transaction) through the NCU section 24, and executes transaction (transmission) of document data such as image data and character data by being connected to Intranet with an I/F not shown in the figure.

Figure 4:
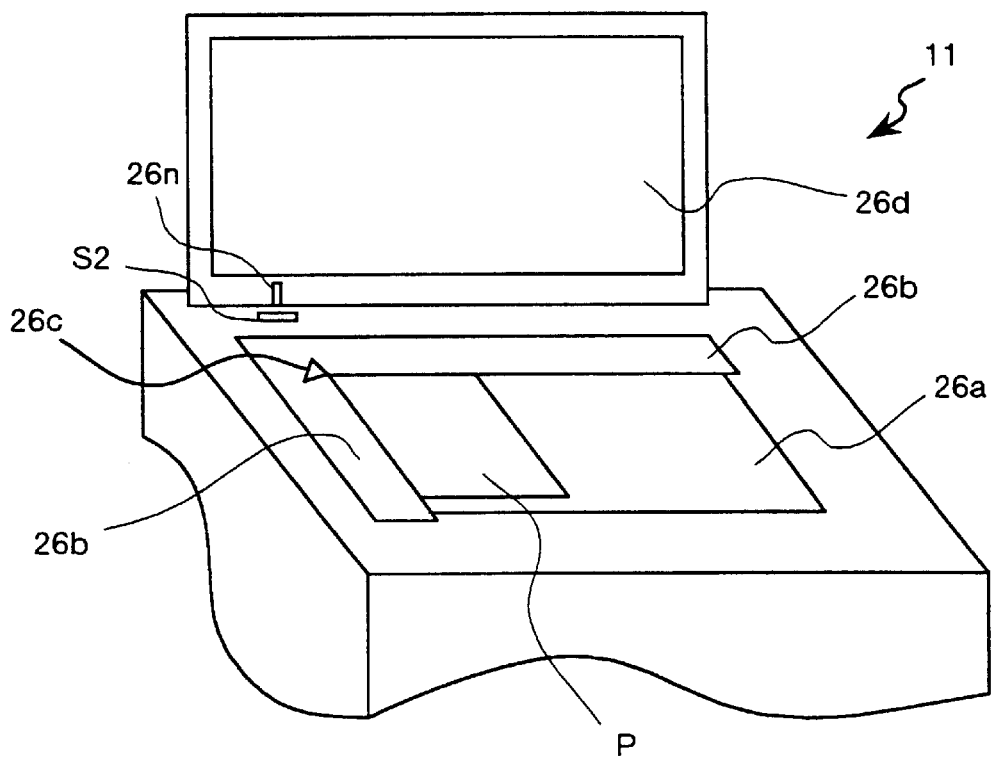
FIG. 4 is a perspective view showing a reader in the file system of the present invention.
Figure 5:
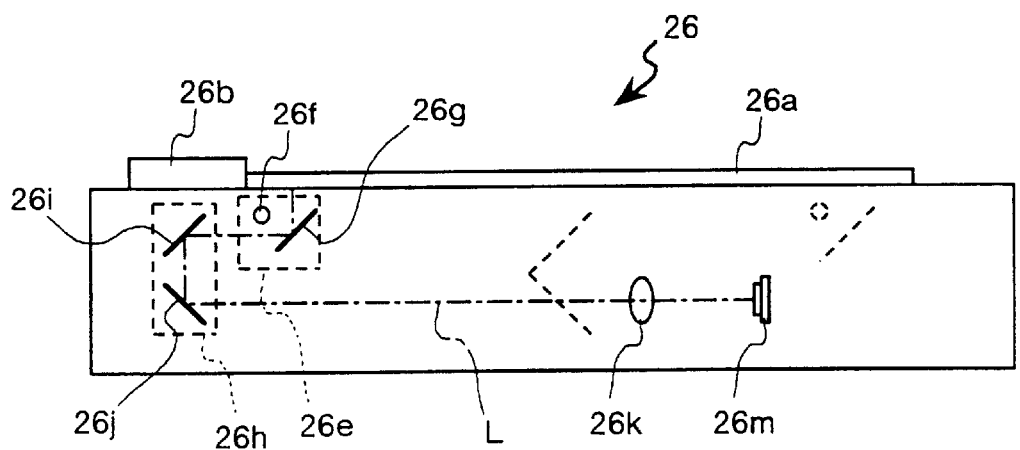
FIG. 5 is a see-through conceptual side view showing internal configuration of the reader in the file system of the present invention.

As shown in FIG. 4 and FIG. 5, the reader 26 reads out a document P placed and positioned on a contact glass 26a which has a large surface area. The document P is placed on the contact glass 26a in such a manner that a corner of the document matches with a document position reference 26c formed because of an angle between document scales 26b. The image data to be copied or transmitted is read from the document P after pressing the document P against the contact glass 26a with the help of a pressure plate 26b. While reading the document P light is irradiated on it from an exposure lamp 26f extending in a main scanning direction mounted on a first carriage 26e and moving in an auxiliary scanning direction. The light reflected from the surface of the document P is deviated by a first mirror 26g and is inverted by the second and third mirrors 26i and 26j mounted on a second carriage 26h. During scanning of the document P the second carriage 26h is moved at a speed half of the speed at which the first carriage 26e is moved in order to maintaining an optical path length L of the reflected light at a constant value. Finally, the inverted light is projected on the CCD (Charge Coupled Device) with the help of an image-formation lens 26k and image data is obtained through photoelectric transfer.

Figure 6:
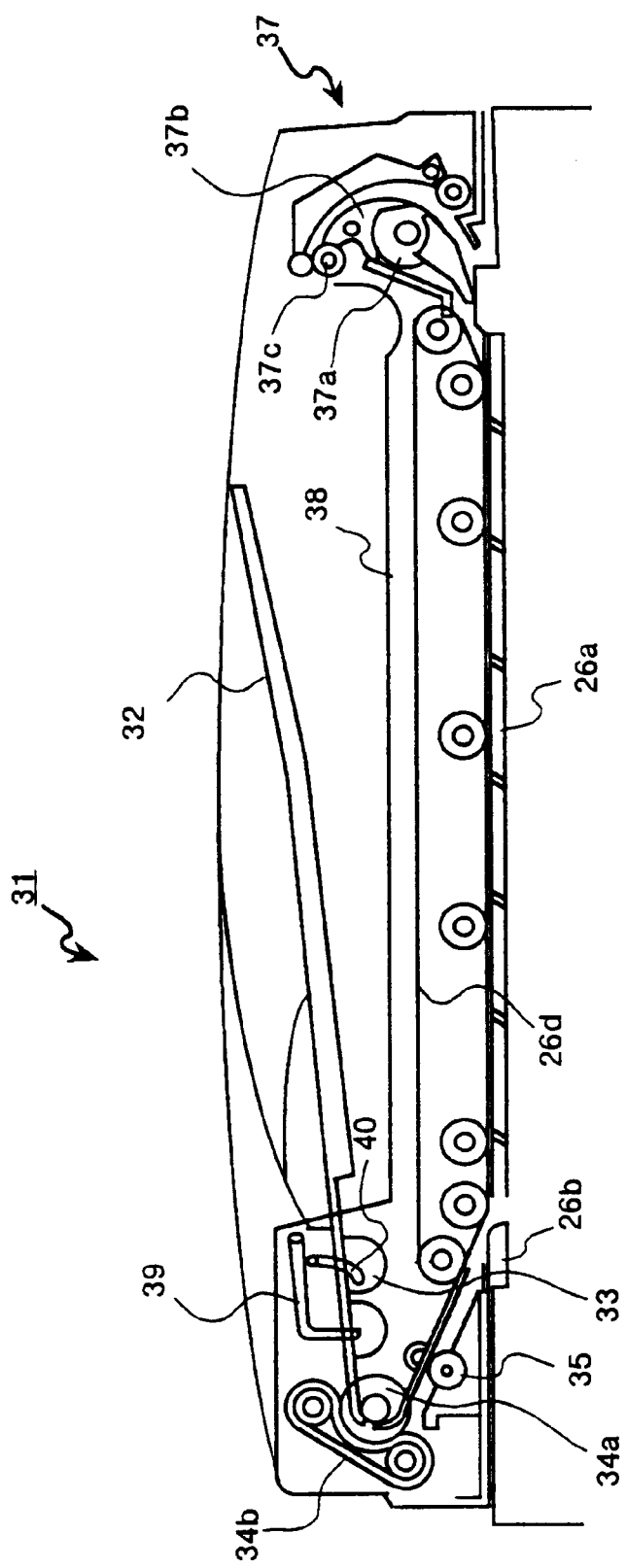
FIG. 6 is a see-through conceptual side view showing an auto document feeder of the reader in the file system of the present invention.
Figures 7A, 7B:
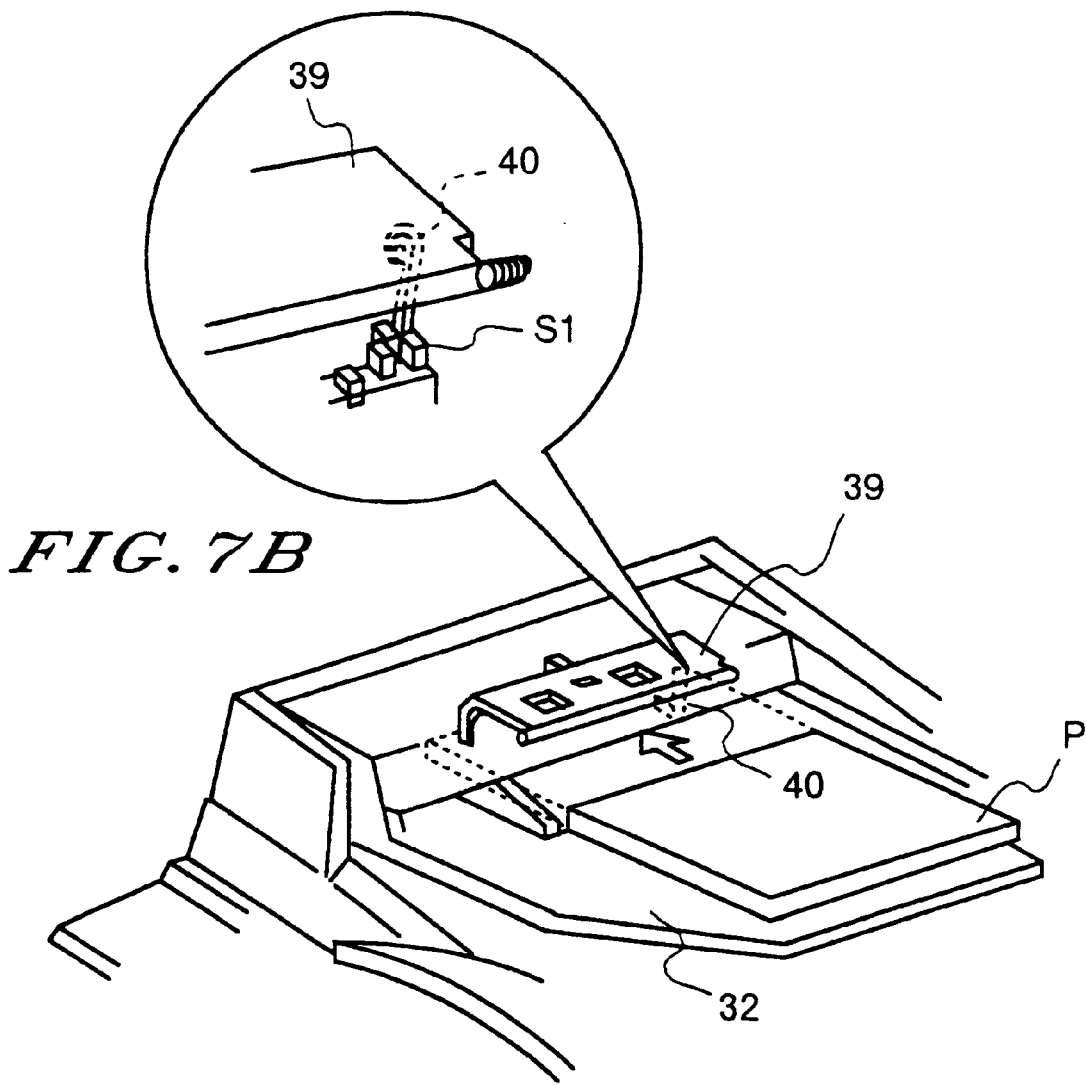
FIG. 7 is a see-through perspective view partially showing the auto document feeder of the reader in the file system of the present invention.

As shown in FIG. 6 and FIG. 7, in this reader 26 there is provided an auto document feeder 31 in order to make it possible to handle a plurality of sheet like documents P automatically. The auto document feeder 31 has a conveyor belt 26d (this belt functions as the pressure plate 26d shown in FIG. 4) functioning as a pressure member that can come in contact with the contact glass 26a and also can be separated therefrom. This auto document feeder 31 separates a document one by one from the plurality of sheet like documents P placed on the document table 32 and fed out to the downstream side of the feeding roller 33 by rotating the feed roller 34a in a regular direction while rotating the separation roller in the reverse direction. A pair of resist rollers 35 transfer the document P to the conveyor belt 26d. The conveyer belt 26d automatically conveys the document onto the contact glass 26a, and after the document is scanned the document is fed out to an output table 38 by an output paper reversing section 37. Designated at the reference numeral 39 in the figure is a stopper for stopping the document P and setting it on the document table 32. Designated at the reference numeral 40 is a feeler for detecting a state where it is pushed by the document P set on the document table 32 by a sensor (photo interrupter) S1 to detect setting of the document P thereon. The output paper reversing section 37 comprises a reversing roller 37a, a reverse/output switching claw 37b, and an output paper roller 37c although detailed description is omitted herein. This auto document feeder 31 detects an open/close state on the contact glass 26a. As shown in FIG. 4, a bias plate 26n is provided near the fulcrum of the feeder and it is detected by a sensor (photo interrupter) S2 provided adjacent to the contact glass 26a when the feeder contacts the contact glass 26a or leaves it.

Accordingly, the reader 26 can perform reading in three different types of modes of ADF (Automatic Document Feed) mode, Book-document mode and Pressure-plate mode. In ADF mode, a plurality of sheet like documents P are set on the auto document feeder 31 and they are automatically conveyed one by one onto the contact glass 26a and positioned thereon. In Book-document mode, the auto document feeder 31 is opened by rotating it along the fulcrum and a book like document is positioned in an inverted manner with the page to be copied opened on the contact glass 26a. Finally, in the Pressure-plate mode, the auto document feeder 31 is opened, and one sheet like document P is placed onto the contact glass 26a and the auto document feeder 31 is closed. The ADF mode, the pressure-plate mode (document placing mode) and the book-document mode (document placing mode) as the reading modes of the document are determined according to information detected by the sensors S1 and S2, and each section of the device is controlled thereby.

The recorder 27 records an image onto a paper of the received or read-out image data, for example, according to any known electrophotographic recording system under the conditions of 400 dpi and 256 levels of gray. The received or read-out image is subjected to bit-map development and stored in the image memory 28 comprising a hard disk drive. Although detailed description is not made herein, the recorder 27 forms an electrostatic latent image by optically writing the image onto a photoconductor electrified while it is rotated according to the received and read-out image data, deposits toner onto the image for toner development, feeds a paper suited for an image to be recorded or with a specified size from a sheet feeder cassette, transfers the toner image onto the paper, fixes the image thereon, and ejects the paper outside the device. It should be noted that, the recorder 27 may employ some other system such as an ink-jet system, a thermal head system, or a dot impact system other than the electrophotographic recording system.

The image processor 29 encodes the image data to be transmitted by compressing the data, and, on the other hand, functions as a DCR (Data Conversion Receiver) for decoding the received image data by decompressing the data. Further, the image processor 29 also performs a processing in which the character data (code data) for a document or the like created by a user with a PC 14 is subjected to map development in the image memory 28 and converted to image data according to a request from the user. It should be noted that the compression of image data performed by this image processor 29 is for the purpose of reducing the amount of data, therefore, any of the known systems may be employed on the condition that both of the copying machine 11 and the server 12 can support the processing of the system. The GBTC (Generalized Block Truncation Coding) system in which bit-map data with 400 dpi and 8 bits for each pixel in the image memory 28 is compressed may be considered as an example.

The copying machine 11 constitutes a processing unit. This processing unit has a transfer function in which facsimile communications for transferring the image data and data communications for transferring document data with PCs 14 are performed. The processing unit also has a copying function in which the read image data is outputted on a paper for recording, and a recording function in which the received document data is outputted onto a paper for recording. Thus, the copying machine 11 functions not only as a copying machine but also as a facsimile machine, a printer, or a scanner. It should be noted that the processing conditions such as telephone numbers of receiver of a fax, addresses of PCs 14, or a reduction ratio while copying and user IDs as well as user names are recorded in an ID card to be set in the operating section 23 of the copying machine 11. The copying machine 11 is programmed to read out the processing conditions when the start key 23d is pressed after a function is selected by pressing the F key 23c on the operating section 23 (no function is selected when copying is to be executed), so that any of the various functions can easily be used. The copying machine 11 can also concurrently read out a user ID from the IC card (by receiving it together with document data when the copying machine is used by the PC 14), store management information such as used processing functions and a number of copied sheets in the RAM of the control section 21 for each user ID so that the management information can be used for accounting or the like. Therefore, document data to be processed can be subjected to desired data processing according to a processing instruction by a user (including a processing instruction from the PC 14 and a record-output instruction for received document data to be processed in the machine) depending on the installed functions, and is also regarded as appended data (particular information) by using the processed data without requiring for inputting a user ID when the processed document data is to be sent out to the server 12 described later, and adds the appended data to the original document data. It should be noted that when the copying machine 11 is operated without inserting an IC card (without supplying a user ID) at that time, a shared ID previously allocated to the copying machine 11 used on a shared cost at the time of accounting is read out from the non-volatile RAM, the shared ID is used as a user ID, and the document data is processed as shared document data.

The multi-functional box 15 functions as a network hub of the copying machine 11, server 12, and the terminals such as PCs 14 to construct a local area network (LAN) environment by relaying data communications between devices, and also constructs an Intranet environment by being connected to the Internet to access a service provider on the Internet from the copying machine 11, server 12, or PC 14 to function so that any of the devices can use various information therethrough.

The PC 14 comprises a CPU, a memory (ROM, RAM), and an I/O (Input/Output) circuit. The PC 14 is designed to be used as a system in which various types of processing such as creation of a document and an image are carried out by performing operation processing according to an application program read-out from a hard disk drive not shown herein (storage medium) through the operation of a keyboard or a mouse by a user while viewing a display. The document data can be printed out or sent by fax to the inputted destination for transmission by using various functions of the copying machine 11 with a user ID and a processing instruction sent out to the copying machine 11, and also the PC 14 can receive image data that the copying machine 11 has received by fax, and receive image data read-out by the copying machine 11.

The Web IMS 16 is connected to the Internet through a not shown communication control unit of a service provider. The communication control unit writably and readably opens the Web IMS 16 in response to an access from an authorized user according to the control program read out from the recording medium by the CPU, and accumulates document data correlated to appended data (particular information) described later as it is continuously sent when an accumulate instruction for backup is issued. When a reference instruction for the document data to be accumulated is issued in continuation with the access, for example, when a transfer instruction for the document data whose address is specified by identifying the appended data (user ID) through the server 12 is sent, the communication control unit reads out the document data with the address from the Web IMS 16 and sends the data back to the destination for transfer according to the reference instruction.

Figure 8:
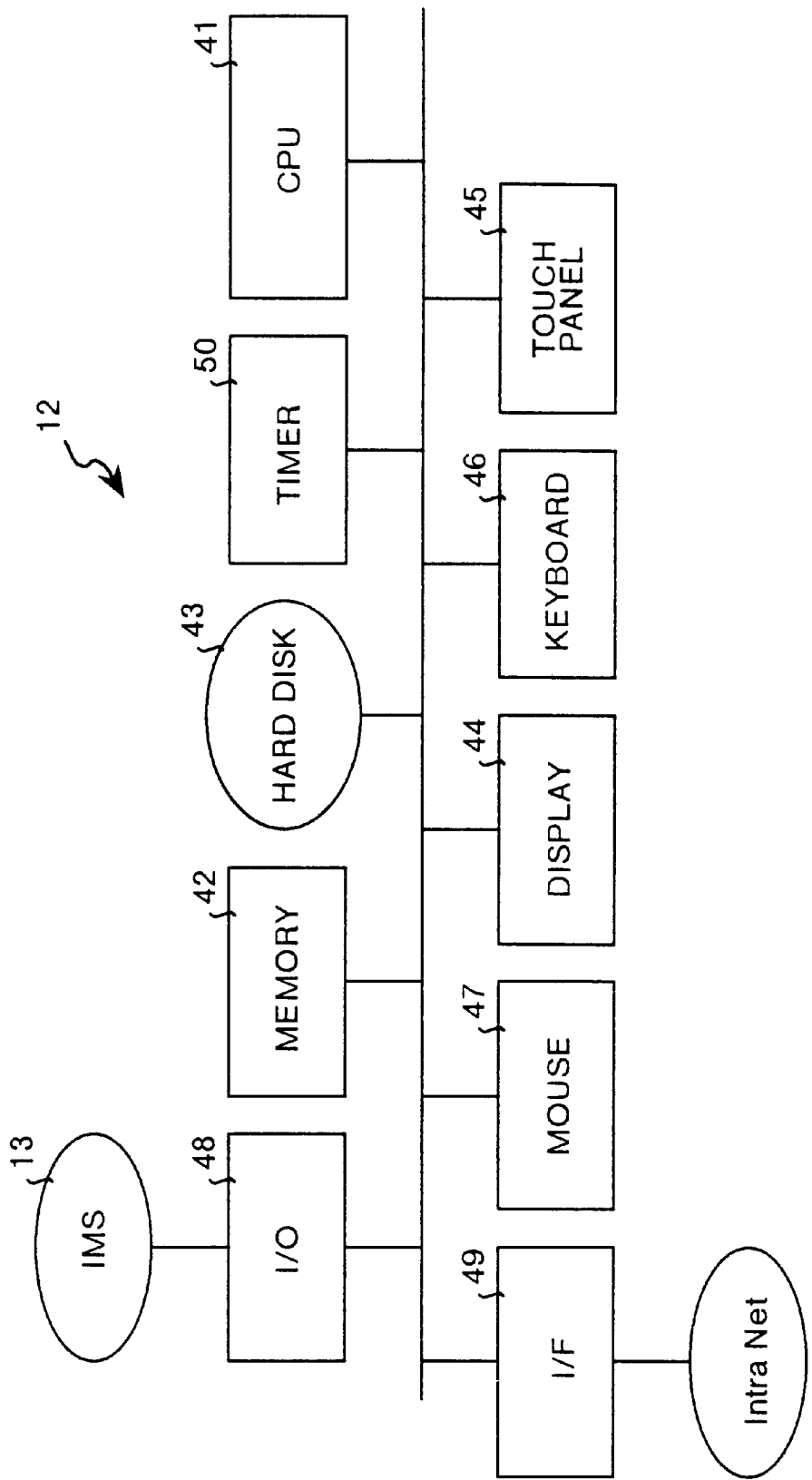
FIG. 8 is a block diagram showing key sections constituting a filing device in the file system of the present invention.

The server 12 comprises, as shown in FIG. 8, a CPU 41, a memory (ROM, RAM) 42, a hard disk (recording medium) 43, a display 44, a touch panel 45, a keyboard 46, a mouse 47, an I/O circuit 48, a network I/F 49, and a timer function 50, and is constructed by a PC usable in the same manner as the PC/s 14. The CPU 41 executes various types of processing according to the present invention by integrally controlling the sections 42 to 50 of the device according to the application program read out from the hard disk 43. Connected to this server 12 is the infinite memory server (IMS) 13 through the I/O circuit 48, and an Ethernet cable for constructing Intranet in the network I/F 49 is also connected to the server 12. In order to receive backup services of the provider, data required for receiving services from the provider through connection to the Internet such as the address of the provider, a registration ID (which is a user ID used for receiving services from the provider, so it may be the same user ID in the ID card for using the copying machine 11), and a password is stored in the non-volatile RAM in the memory 42.

The server 12 receives data to be processed by the copying machine 11 through the Intranet, transmits the data to the infinite memory server 13 connected to the Intranet and accumulates the data therein as it is. The infinite memory server 13 comprises a storage unit for accumulating the data therein. The server 12 also checks the used amount of capacity (accumulated amount of data) in the infinite memory server 13, and when it is found that the amount exceeds the preset amount, the access to the provider on the Internet is made with the address of the provider, registration ID, and the password stored in the memory 42 before or after document data is accumulated to successively read out a specified amount of document data in the order from the oldest one to be transferred, and the transferred data is accumulated in the Web IMS 16. In addition, this server 12 reads out a portion of the document data or appended data (e.g., a thumbnail image in the header page) accumulated in the infinite memory server 13 in response to the request from the user and outputs the data for being selectably displayed on the display 44, reads out the selected document data from the infinite memory server 13 to transfer the data to the copying machine 11, and functions as a file unit and also functions the data management system 10 as a file system by, for example, outputting the data for recording. When it is required to refer to the document data transferred from the infinite memory server 13 to and accumulated in the Web IMS 16, the access to the provider on the Internet is made with the address of the provider, registration ID, and the password stored in the memory 42, and the same processing is performed. Namely, the server 12 constitutes an accumulation managing unit as well as an output managing unit.

Figure 9:
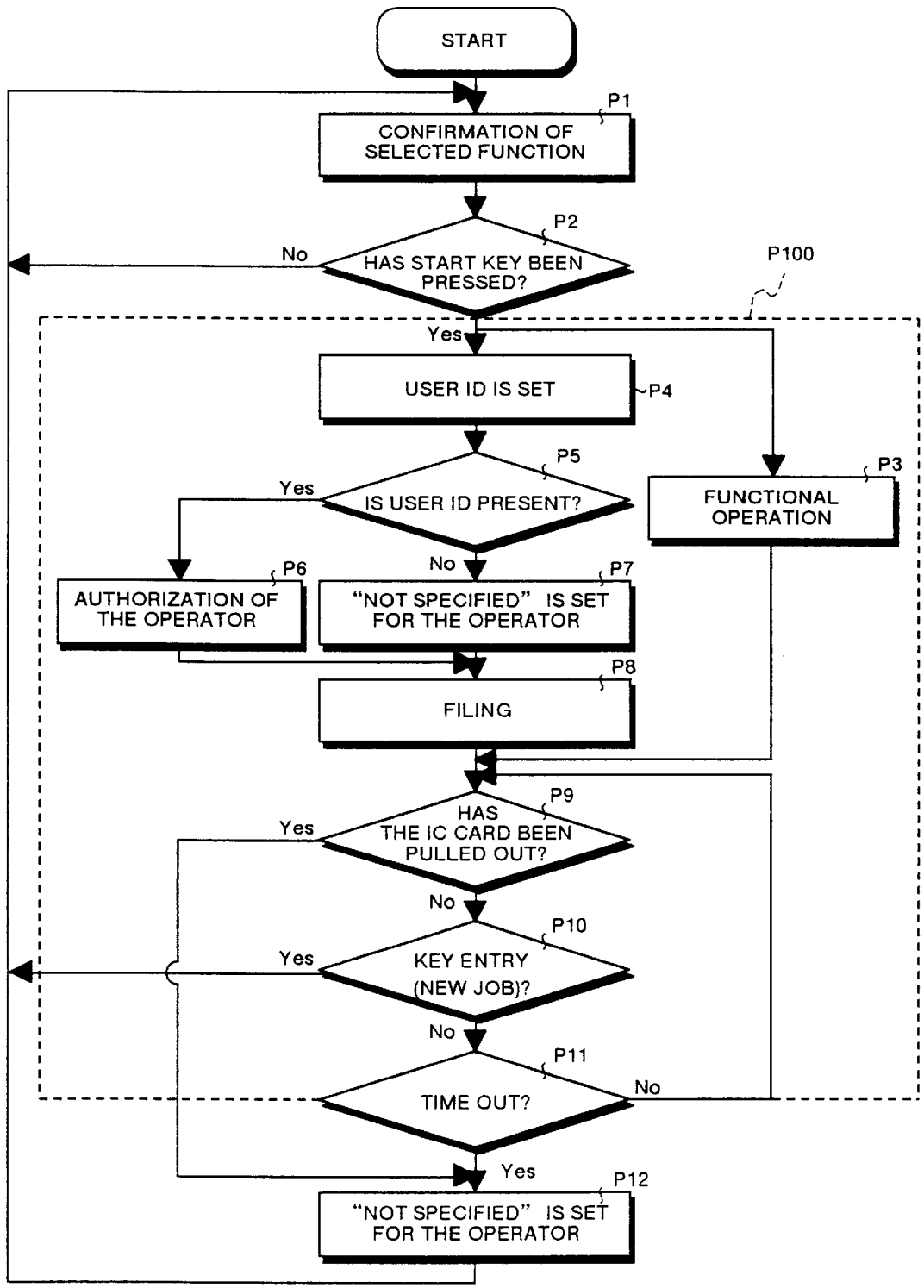
FIG. 9 is a flow chart showing a portion of the filing processing performed by the filing device.

Specifically, as shown in the flow chart in FIG. 9, in the copying machine 11, when copying is started by pressing the start key 23d (step P1, P2) through the operating section 23 of the copying machine 11, document data from the document image set on the reader 26 for copying is read (step P3). Then the operator (a user using the copying machine 11) is authorized and set according to the user ID read out from an IC card when the IC card is set in the operating section 23 (steps P4, P5 and P6). On the other hand, when a user ID can not be acquired, a shared ID read out from the non-volatile RAM of the control section 21 is regarded as the user ID, and "Setting is not specified" is set for authorization of the operator (step P4, P5 and P7).

Figure 10:
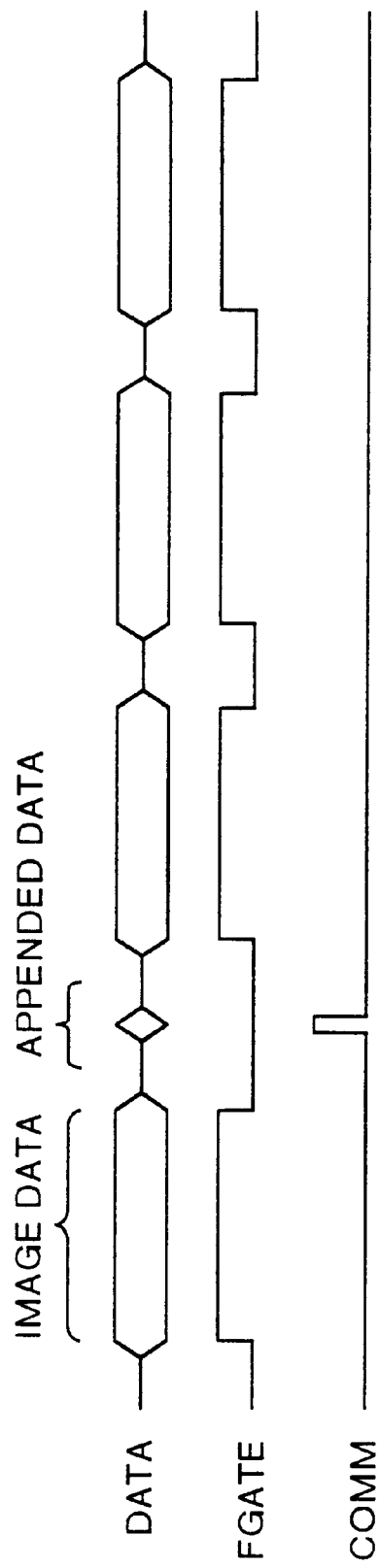
FIG. 10 is a timing chart showing data to be filed in the filing processing.
Figure 11:
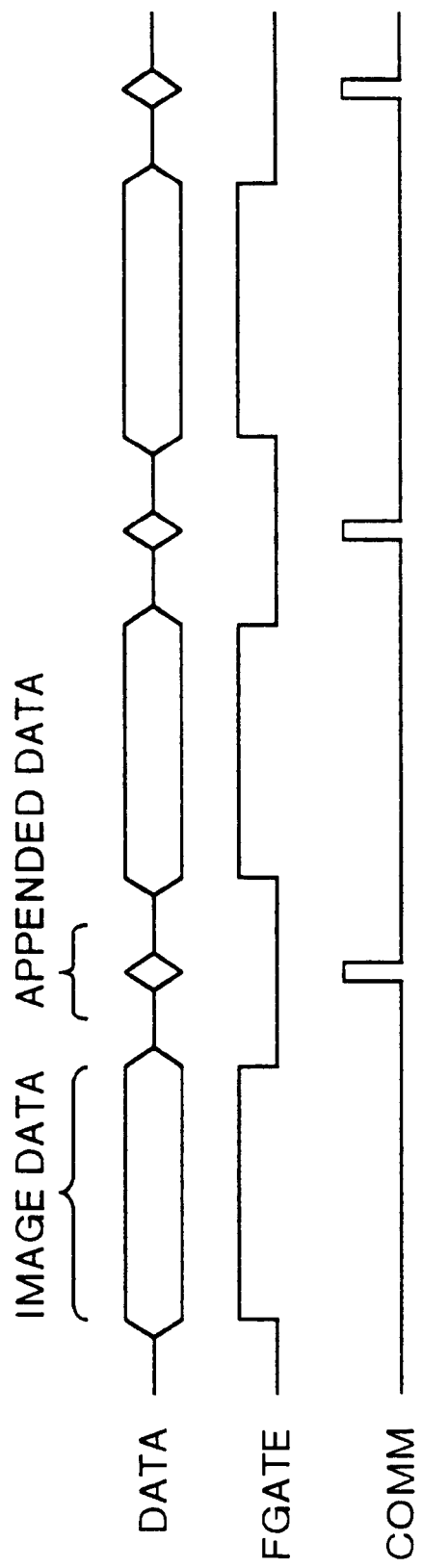
FIG. 11 is a timing chart showing the filing processing.
Figure 12:
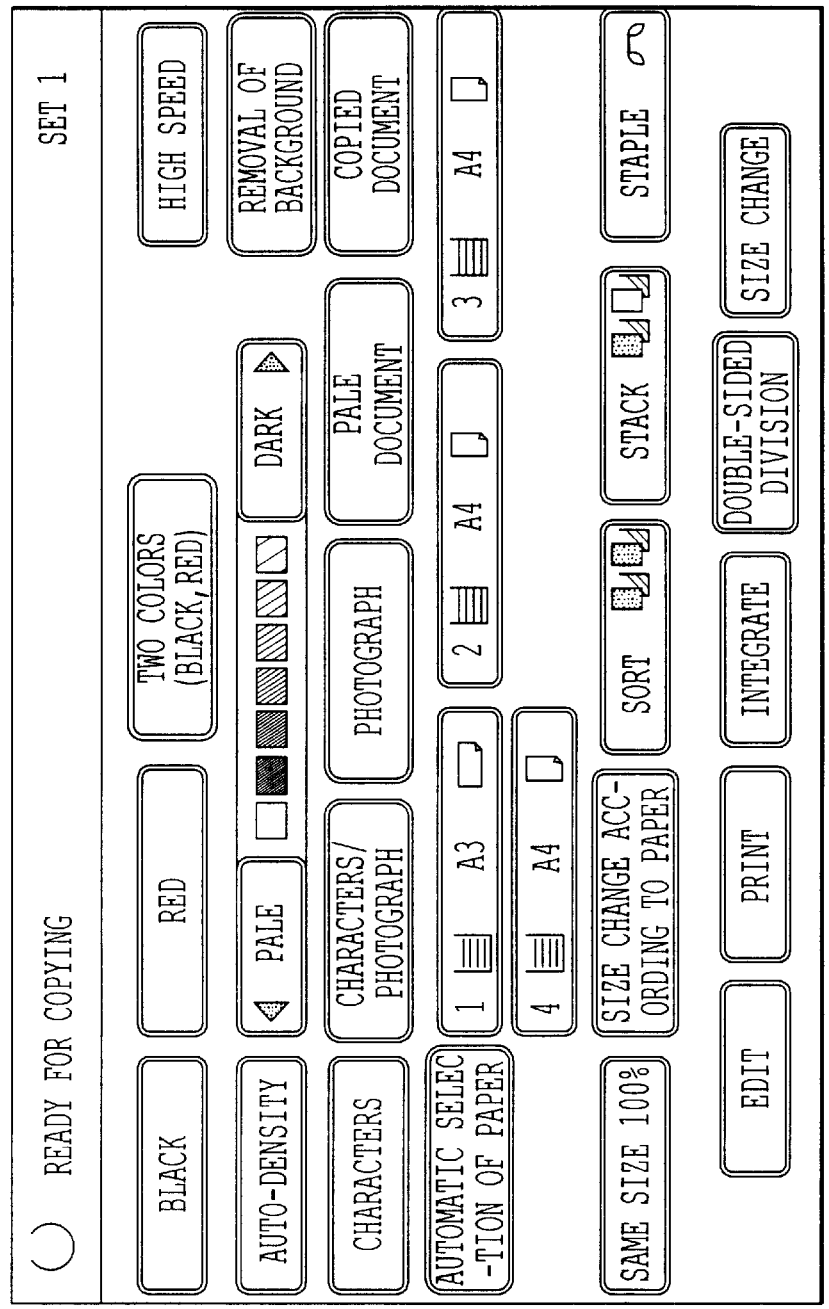
FIG. 12 is a plane view showing a display unit for explaining appended data to be filed and a portion of the operating unit for the filing processing.

The copying machine 11 encodes and compresses the same document data by the image processor 29 in parallel to the processing by a selected function, and then adds information for date to be processed measured by a timer function which is not shown together with the user ID and conditions (such as a reduction ratio and a reading mode such as an ADF mode) for processing to the document data as the appended data (code data) and sends out the added data to the server 12 which accumulates (on file) the data therein (step P8). At this point of time, the image data is temporarily stored in the image memory 28 and synchronized to a FGATE signal indicating an image area while the appended data is synchronized to a COMM signal indicating an information area and transmitted to the server 12. However, the appended data at this point of time is integrated into one processing, as shown in FIG. 10, by being transmitted in a format of its accompanying only the header or end of document data even if the document P includes a plurality of pages, and accumulated in the infinite memory servers 13 and Web IMS 16 in correlation to the processing conditions so that memory space to be occupied (used) therein can be saved. It is needless to say that document data for each page may be accompanied with appended data and sent to the server 12, as shown in FIG. 11, when the user wants to know more detailed processing conditions for adjusting copying density or the like for each page at the time of copying processing.

Accordingly, as for the same document data to be processed by the copying machine 11, a particular input operation is not required other than the operation required for performing the processing (regardless of whether an accumulate instruction is inputted or not), however, appended data to identify the document data is added (correlated) thereto to automatically be accumulated, and backup copies thereof are saved. At that time, even if the data is document data to be processed without a user ID, the data is also accumulated using the shared ID without requiring entry of the user ID.

It is determined that the operator has ended the processing when he/she pulls the IC card out (step P9), and it is also determined that the operation has ended when a period of time measured by a timer function which is not shown after the processing of reading a document set on the reader 26 is has ended and it is detected that a time-out has occurred (step P11). A user ID for identifying an operator performing the processing to document data is cleared when either of the conditions is satisfied, and a shared ID as the default is set (authorized) just in case where a user ID can not be acquired so that an operator column is set to "Setting is not specified", and with those operations, the possibility that the same user ID is used by different users can be prevented (step P12). Then, in steps P9 and P11, when a start instruction to new processing is issued through other key entry, for example, by pressing the F key 23c or the start key 23d before the time-out measured by the timer function does not occur with the IC card kept to be set in the copying machine 11 (step P10), the processing returns to step P1 by maintaining the same user ID, and the same processing is repeated.

Accordingly, a user ID is added to document data without fail by being fetched again when it is accurately detected that the operator has changed.

At this point of time, the copying machine 11 is programmed to skip a step of backup processing in the control program and continue only the processing for a provided function by pressing an "undo" button (which is different from the "job recall button" 23f in FIG. 3) not shown in the figure provided on the operating section (Operation display panel) 23 during the steps P2 to P11 (step P100). Further, when the "undo" button is pressed after accumulation of document data is started by executing the processing in step P8 the appended data for accumulated data during accumulation or immediately after the accumulation before the next processing instruction is deleted, the processing of reading out the document data to be deleted is invalidate, and the accumulation of the document data is cancelled. It should be noted that, the same processing as that when the "undo" button is pressed is performed when the "job recall button" 23f is pressed to cancel the instruction for copying itself.

Therefore, as for document data of which backup copies are saved without requiring any entry operation other than the operation for using functions of the copying machine 11 by the user, the accumulation thereof can be canceled only by pressing the "undo" button on the operating section 23 during steps P2 to P11. Thus, when a highly confidential image is to be copied, for example, it can be prevented that the document data for the image is reusably saved on file.

Herein, as appended data to be sent out to the server 12 by the copying machine 11, transmission processing conditions such as a telephone number and an address of a destination to be transmitted required for transmission processing, a reading mode of a document such as an ADF mode, a pressure-plate mode and a book-document mode required for copying (recording) and document/paper conditions regarding the document or paper and image processing conditions on processing to image data are received (fetched), and added to document data to be accumulated. Any data may be used for this appended data on the condition that it is useful for identifying the processing. For example, when copying is to be executed, in order to improve convenience of copying, this copying machine 11 is designed to enable selection of processing conditions such as a copy density; an image mode (correction processing or the like); a size change ratio; post-processing for papers such as discharging by sorting papers having been copied or binding the papers by a stapler; copying of an image on both surfaces of a paper; divided copy of an image; integrated copy of an image; printing of date, stamps, and pages added to an image when copying; and edited copy of an image. Thus, these image processing conditions are received (fetched) as the processing conditions together with document/paper conditions including a number of copies to be obtained through a copying operation, size and orientation of a document for automatically identifying any size in a range from A3 at the maximum to B6 at the minimum, and size and orientation of a paper for being selected according to setting and image processing conditions, and then these conditions are added to document data to be accumulated.

Figures 13, 14:
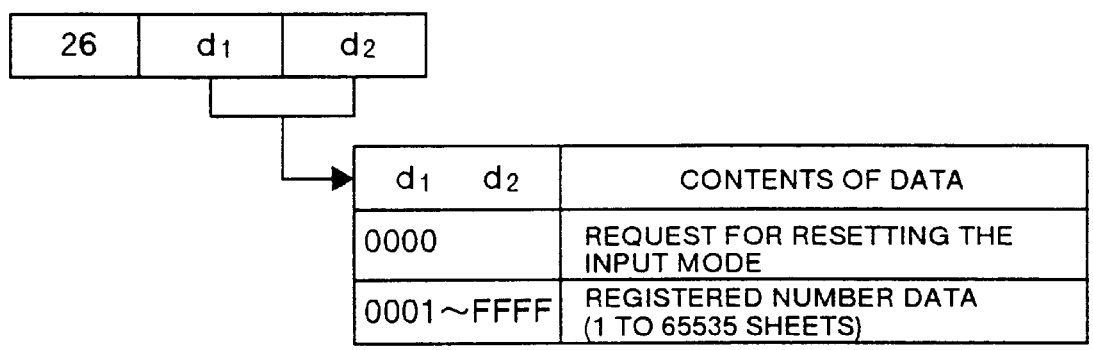
FIG. 13 is a list for showing the appended data to be filed.
FIG. 14 is a list showing one of the appended data.

It should be noted that, in this copying machine 11, a document is not copied under the default copying condition (e.g., automatic paper selection, a size change ratio: 100%, and automatically adjusted density) obtained by just pressing the start key 23d when copying. When the F key 23c is pressed to select a copying function, the screen shown in FIG. 12 appears on the display operating LCD 22a. The user operates the ten-key 23b on this screen and sets the numerical values and various modes (commands in FIG. 13) for the document/paper conditions and image processing conditions. For example, number of copies to be obtained through the copying operation inputted using this ten-key 23b (a number of copies capable of being set at the default) follows, for example, the registered number data "26" "00" "01" as shown in FIG. 14 to be set as appended data accompanying a command 26H when the registered number is "1". As appended data such as the document/paper conditions and image processing conditions inputted through the display control LCD 22a, there are data to be used such as contrast setting data in Command 33H as auto copy contrast for controlling copy contrast corresponding to an image or as 7-stage arbitrary copy contrast; document type data included in Command 28H as a type of image quality of characters or photographs on a document image; paper feed position data in Command 31H for deciding paper size/orientation by specifying paper to be used to any of paper feed cassettes. Further, setting data for an auto contrast selection mode in Command 32H for automatically selecting a paper feed cassette (paper) according to the document size as its document size/orientation as well as to the size change ratio; setting mode for a size change mode in Command 35H indicating a size change ratio such as a fixed scaling decided according to the document size and paper size may be used as the appended data. Further, a zoom by 1% sizes by setting entry of arbitrary data, a change of size by inputting and setting a length of a document image or an image to be copied, and an independent scaling by inputting and setting each scaling ratio for longitudinal and lateral sides may be used as appended data. Further, setting data for a double-sided mode in Command 27H as a double-sided copying for recording images on a double-sided/a single-sided document or a double-page spread of a document onto a double side of paper; setting data for a division mode in Command 28H as a divided copying for recording images on a double-sided document and a double-page spread of a document onto each single side of paper; setting data for an intensive mode in Command 29H for integrating images on a plurality pages of a document into a single side or a double side of paper may be used as the appended data. Further, a print mode in Command 2AH as printing in copying that a processed date, a stamp such as "Urgent" or a user's mark, and a number of pages are automatically added to a copied image; an edit mode in Command 34H as copying after editing an image such as double copy for arranging the same image on one side, margin preparation for formatting a margin at the center of a book document or at the periphery of a document, binding margin preparation for formatting a margin on one side of paper; and delete processing for deleting only a specified color.

On the other hand, in the server 12, the CPU 41 fetches appended data for identifying document data and adds the appended data to the document data in order to easily use the server as a file unit. More specifically the CPU 41 fetches as this appended data, in addition to a user ID, additional information such as a title given to document data received from a PC 14 with which the document data can be fetched; keywords each obtained by subjecting document data to processing by an OCR (Optical Character Reader) to encode character data and repeatedly used in a text to be extracted; and particular information for contents of document data such as a number of output times that the same document data is repeatedly reused.

Accordingly, any of the document data accumulated in the infinite memory server 13 and Web IMS 16 can easily be identified with this appended data.

The server 12 has a database with appended data stored therein prepared by dividing into each user ID in the hard disk 43 for the purpose of enabling easy retrieval of the document data accumulated in the infinite memory server 13 and Web IMS 16. In this database, addresses in the infinite memory server 13 and Web IMS 16 in which document data is accumulated for each user ID added to the document data are stored, and the fetched appended data is stored in a column prepared for each type of the data. Therefore, in the server 12, when a user inputs the user ID for issuing a request to refer to document data, the CPU 41 reads out the document data correlated to the user ID from the infinite memory server 13 and Web IMS 16 according to the reference instruction. Further, the CPU 41 selectably outputs the document data as a thumbnail image (a displayed image obtained by reducing encoded image data on the header page) 61 for each processed date (processed data information) on the screen of the display 44 with a calendar-view format 60 thereon that can be scrolled at high speed or low speed by the scroll button 59 as shown in FIG. 15 so that the user can retrieve and confirm the data. When the user wants to check document contents such as characters, selected document data capable of scrolling can be outputted for filling the screen of the display 44 by selecting the thumbnail image 61 through clicking on it with a mouse 47 or pressing its displayed point on the touch panel 45 and further selecting a call button 62.

Figure 16:
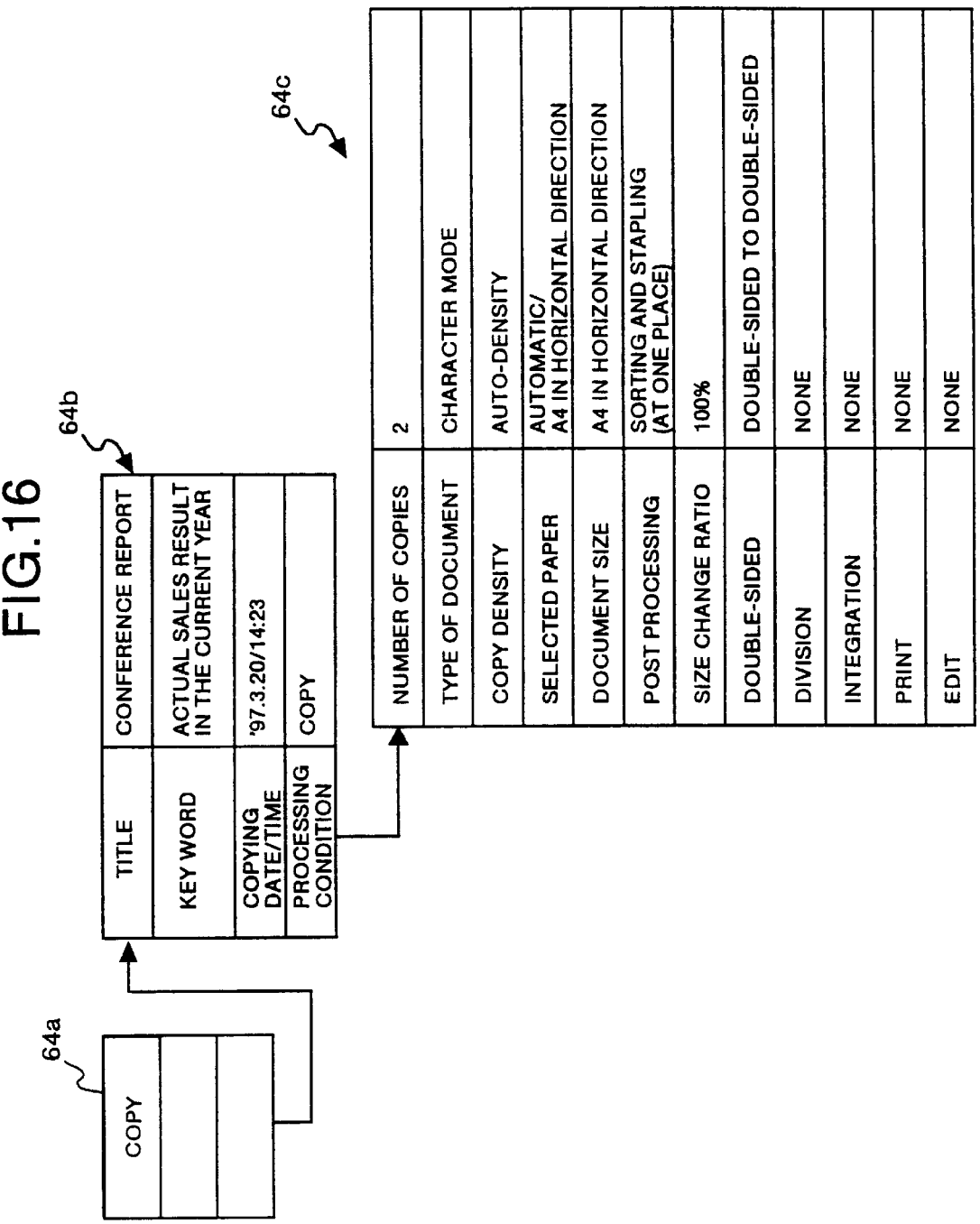
FIG. 16 is a flow diagram with a list for explaining the reference processing.
Figure 17:
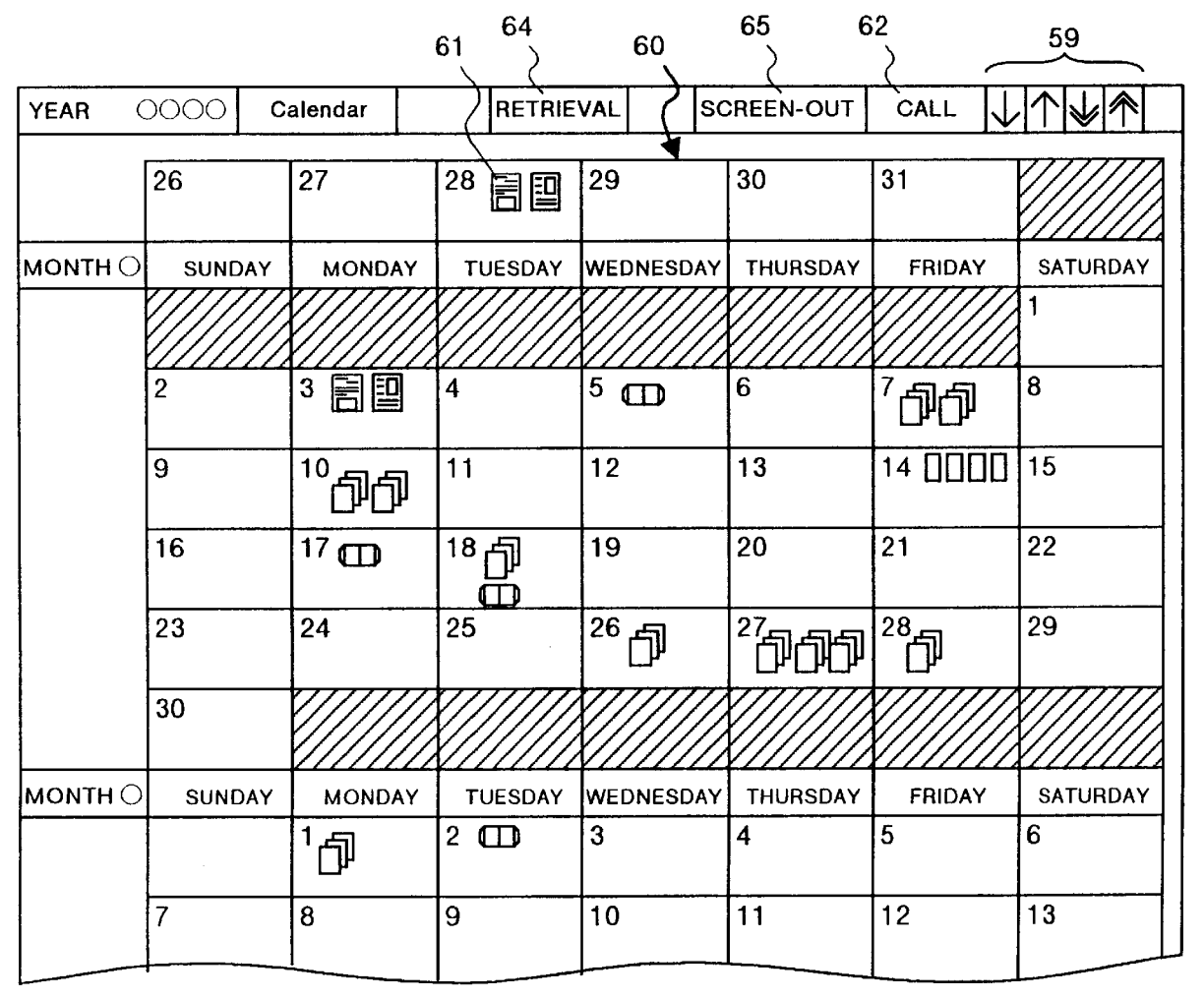
Figure 18:
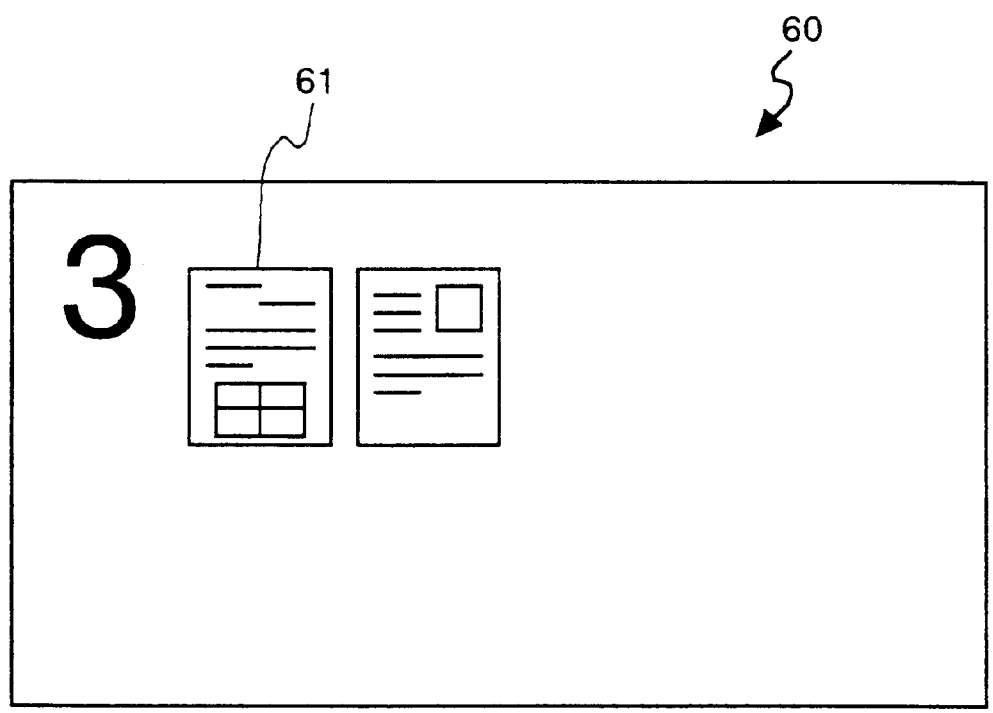
FIG. 18 is a partially enlarged view of the display screen.
Figure 19A:
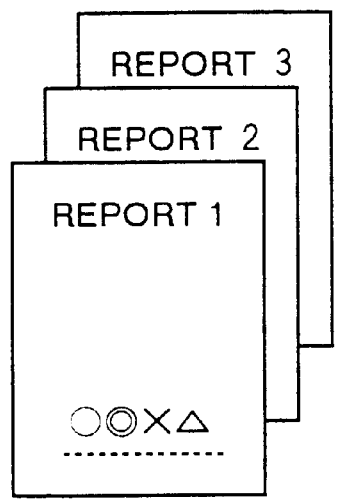
FIGS. 19A and 19B are enlarged views of a reduced image appearing on the display screen.
Figure 19B:
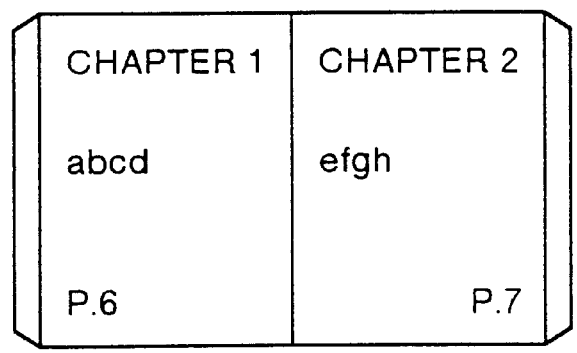

Further, when a copy button 64*a* shown in FIG. 16 displayed by selecting a retrieval button 64 on the display screen in the calendar view format 60 of the display 44 is selected, as shown in FIG. 17, thumbnail images prepared according to reading modes of a document such as the ADF mode, pressure-plate mode, and book-document mode each for copying are displayed in the calendar view 60. When the pressure-plate mode is selected, for example, a reduced image of a header page shown in FIG. 18 is prepared and displayed in a corresponding date column in the calendar view 60, and a reduced image indicating a state where a plurality sheets of document P are layered shown in FIG. 19A when the ADF mode is selected as well as a reduced image indicating a state of a double-page spread shown in FIG. 19B when the book-document mode is selected are also prepared and displayed in corresponding date columns therein respectively, so that each reading mode of the document P can visually be recognized in the calendar view 60. Then, by selecting the retrieval button 64 in the calendar view 60 again, a list shown in FIG. 16 is successively displayed from the upper in the left side and processing to document data can be checked, so that a list 64*b* with appended data therein such as a title and a keyword of the document data can be displayed and checked. When a processing condition in the list is further selected, a list 64*c* with appended data therein such as the number of copies, a type of document can be displayed and checked. It should be noted that, during the above operation, the server 12 executes, when the user specifies an arbitrary period as appended data through entry of date and time information and requests to refer to document data included in this period, reference processing according to the calendar with the period displayed therein.

Figure 20:
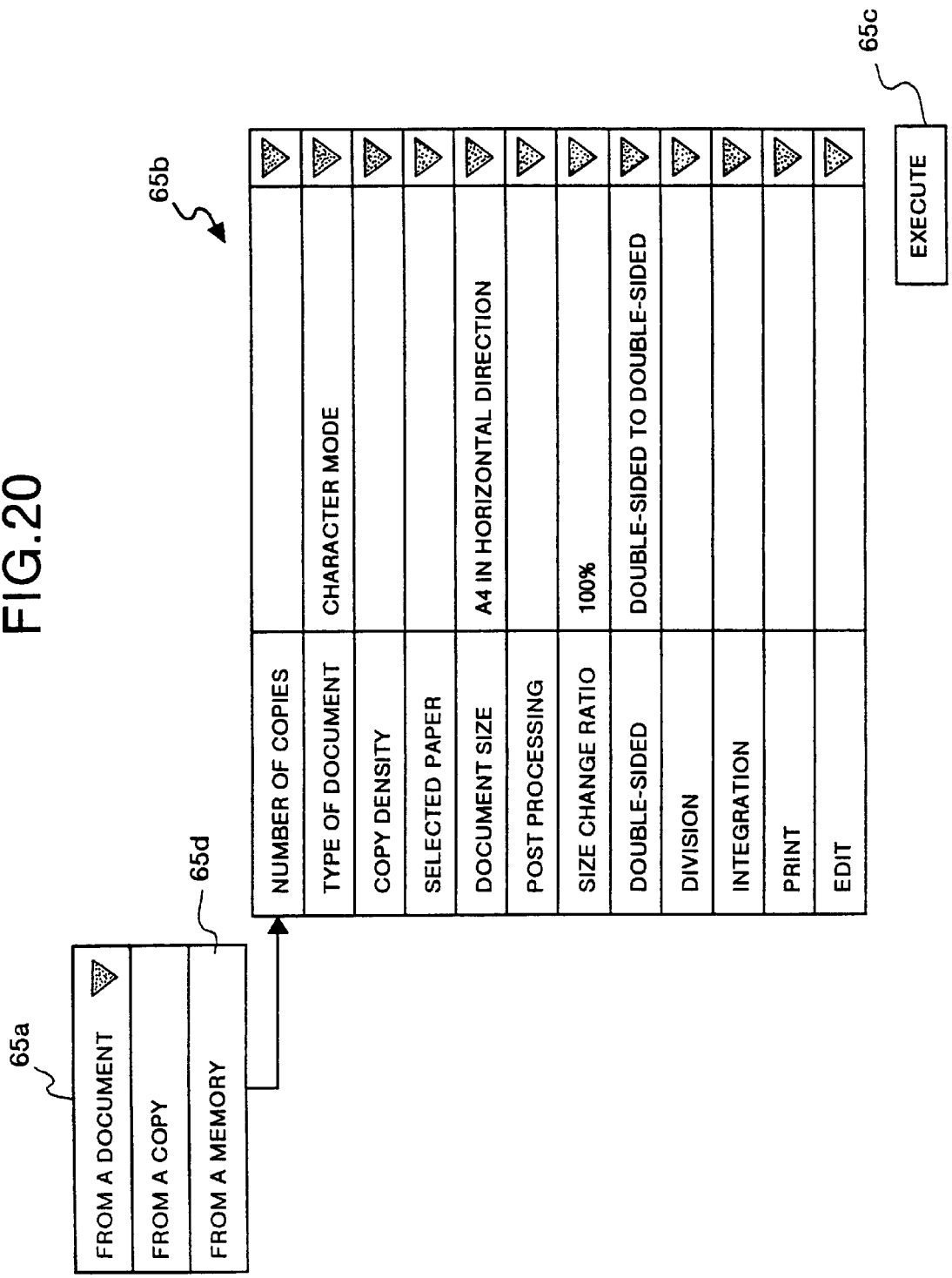
FIG. 20 is a flow diagram with a list for explaining the reference processing.

The server 12 can selectably display thumbnail images in the calendar view 60 without displaying the unnecessary document data when the user inputs the user ID to make a request for referring to document data and if the user selects a screenout button 65 in the calendar view 60 shown in FIG. 15 and further selects a type of appended data with the help of the memory at the time of processing by successively displaying the list shown in FIG. 20 from the upper in the left side. Thus, it is possible to specify a condition with which each mode for a document size and orientation or the like in the list 65*b* can be set by selecting a document button 65*a* and clicking on each mark "∇" in the right columns. When the double-sided mode is selected, for example, a single side→a double side, a double side→a double side, a double side in right and left pages, and a double side in top and back pages are successively displayed. When one of these is selected and then an OK button 65*c* is presses, through which any thumbnail image of the document data with the corresponding appended data correlated thereto in the calendar view 60 is underlined and displayed (e.g., a red color, blinking, a reverse video, or nothing displayed but the corresponding data). When there is a plurality of corresponding document data, the list 64*b* with appended data therein such as a title and a keyword of document data is displayed and checked, in the same manner as described above, by selecting the retrieval button 64 and screen-out button 65, and by further selecting the thumbnail image 61 and call button 62, a desired document data can also be displayed on the entire screen of the display 44.

Figure 21:
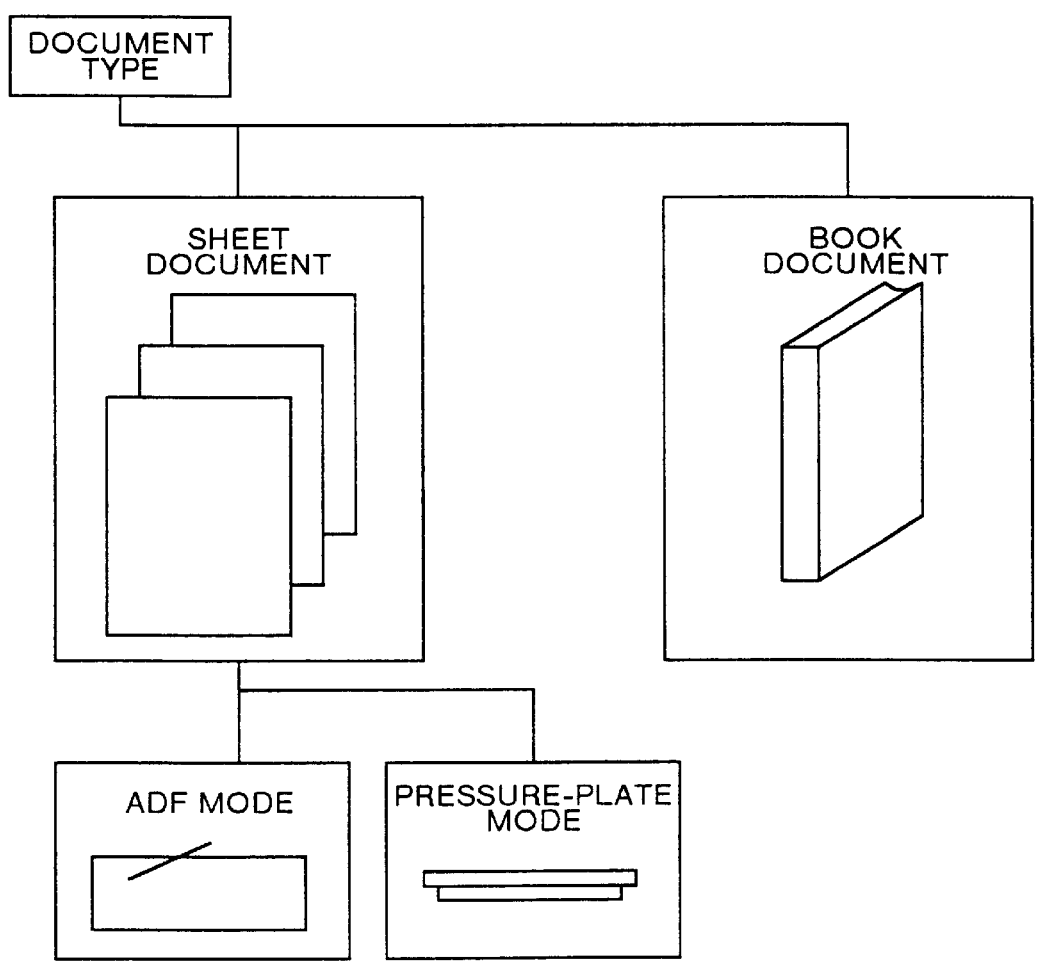
FIG. 21 is a flow diagram with marks for explaining the reference processing.

Further, reading modes for copying can successively be selected along a branch format (what is called a tree structure) by selecting a memory button 65*d* in the screen-out button 65 within the calendar view 60. As shown in FIG. 21, for example, there are displayed marks (icons) for selecting either a sheet document or a book document as a type of document. When the book document is selected by clicking on it, only the thumbnail image 61 of the image data shown in FIG. 22B read out in the book-document mode is highlighted and displayed in the calendar view 60. Marks are displayed for selecting either the ADF mode or the pressure-plate mode as a reading mode of a document when the sheet document is selected. Only the thumbnail image 61 of the image data shown in FIG. 22A is highlighted and displayed therein when the ADF mode is selected, and only the thumbnail image 61 of the image data shown in FIG. 18 is highlighted and displayed in the calendar view 60 when the pressure-plate mode is selected. Thus, image data can easily selected even if there is a plurality of corresponding document data by selecting the retrieval button 64 and the reading mode in the same manner as described above, and a desired document data can be displayed on the entire screen of the display 44.

Accordingly, the server 12 can display, when the user selects a menu for requesting to refer to document data processed by the copying machine 11 on the screen to reuse the document data, thumbnail images 61 matched with the user ID in a calendar format thereon in order of the latest one or of an arbitrary period. Further, the server 12 reads out full document data (fetches again full document data having been processed) easily selected from the thumbnail images 61 by the user with a mouse to send the read-out data to the copying machine 11 together with the appended data. The copying machine 11 can decode the document data by the image processor 29 to recover it and also outputs the data for recording according to the appended data used for processing of the image, so that the user can obtain the same document data as that having been outputted for saving backup copies thereof by reproducing it without inputting the processing conditions. In addition, the server 12 reads out, when older document data than that accumulated in the infinite memory server 13 is instructed to be referred to, data such as the address of the provider, the registration ID and password for each user ID from the built-in non-volatile RAM to get access to the provider on the Internet and sends the reference instruction for the document data thereto. Thus, the server 12 can perform the processing of referring to any of the accumulated document data also by handling the Web IMS 16. The server 12 can also perform, for the shared document data having been processed without inputting a user ID, processing of referring to the document data correlated to the user ID (shared ID) by regarding a shared ID used for the copying machine 11 as a user ID used for referring thereto according to the reference instruction for the shared document data on condition that the user ID used for the copying machine 11 is inputted.

Further, when image data having been copied is to be reused, the data can easily be selected from the thumbnail images 61 showing the reading modes and outputted for recording, and hence the image data having been outputted at the time of backup can be reproduced and acquired with reduced operation of selecting processing conditions.

In this embodiment as described above, the same image as that to be copied by the copying machine 11 can automatically be accumulated (backed up) in the infinite memory server 13 and Web IMS 16 on an intranet without requiring any particular entry operation and easily stored and managed, and any of the data is transferred from the infinite memory server 13 and Web IMS 16 by instructing reference processing from the server 12 as required, so that the desired data can be acquired again by being copied with the copying machine 11 or the like. This image data can be reproduced through the processing of easy retrieval and selection of search by correlating processing conditions by the copying machine 11 to the data as appended data and accumulating/ managing the data.

Further, when image data having been copied is to be reused, by making the use of a reading mode of a document P, which may be remembered in many cases, according to a type of document when copying, the image data can easily be selected from the thumbnail image 61 showing the reading mode in the calendar view 60 and outputted/ recorded depending on the memory as to whether or not the auto document feeder 31 was used (ADF mode), whether or not the document was manually placed although it was a sheet document (pressure-plate mode), or whether or not the document was a book document (book-document mode).

As accumulation of document data can be canceled by pressing the "undo" button (reading can be disabled), it is possible to avoid that data whose backup is clearly unnecessary and data requiring security are accumulated, and also to resolve detrimental effects due to its automatic backup.

As another aspect of this embodiment, in place of the thumbnail images 61 shown in FIG. 18, the marks showing reading modes of the ADF mode and the book-document mode may be displayed in the calendar view 60 as shown in FIG. 22 and selected. As shown in FIG. 23, it is needless to say that the ADF mode, pressure-plate mode, and book-document mode according to a type of document may directly be selected in place of selection based on the type of document shown in FIG. 21.

Although it has been described that the appended data is automatically added to document data in the Embodiment, it is needless to say that a user may input data including various modes of reading through the operating section 23 of the copying machine 11.

In accordance with the present invention, when image data is read out from a document by using a copying function of the main body of a processing unit and recorded/ outputted (copied), the same data together with reading modes such as automatic paper feeding and manual placement of a document can be accumulated in the memory. Then, the image data in the memory can be used by reading out as required, and when a material having been copied is lost, for example, the image data having been backed up can be acquired again by being outputted and recorded. At this point of time, image data in the memory can be selected according to the reading mode when it has been copied, for example, by changing image data to a reduced image in a form according to a reading mode and displaying the data, the image data to be outputted again can easily be selected. Accordingly, the image data having been processed can easily be used as required, which allows usability thereof to be enhanced.

When data is processed by the main body of a processing unit, accumulation processing of the processed data can be cancelled by inputting an accumulation avoidance instruction, and hence it is possible to avoid that data whose backup is clearly unnecessary and data requiring security are accumulated, and also to resolve detrimental effects due to its automatic backup, which allows usability thereof to be enhanced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A file system applied to processing unit having a copying function for copying data from a document, said file system comprising:

a memory;

an accumulation managing unit configured to accumulate and store in the memory both the data copied from the document and a reading mode used by the processing unit to copy the data from the document, and configured to correlate the data copied from the document together with the reading mode; and an output managing unit configured to display the reading mode correlated with the copied data stored in the memory, and configured to read and output the copied data stored in the memory correlated with the reading mode when the reading mode is selected from the display, wherein the reading mode corresponds to at least one of 1) a document fed by an automatic document feeder included in the processing unit, 2) a sheet document manually placed on a read position including in the processing unit, and 3) a book document manually placed on the read position.

2. A file system according to claim 1, wherein the processing unit has a document pressing unit configured to press the document manually placed on the read position.

3. A file system according to claim 2, wherein the reading mode further corresponds to an open/close action of said document pressing unit.

4. A file system according to claim 1, wherein said output managing unit prepares a reduced image of the copied data and displays the reduced image with the corresponding reading mode on a display unit.

5. A file system according to claim 1, wherein said accumulation managing unit cancels the accumulation of the copied data when it receives an accumulation avoidance instruction before the copied data is accumulated in said memory or during accumulation thereof.

6. A file system applied to a processing unit having a copying function for copying data from a document, said file system comprising:

a memory;

an accumulation managing unit configured to accumulate and store in the memory both the data copied from the document and a reading mode used by the processing unit to copy the data from the document, and configured to correlate the data copied from the document together with the reading mode; and an output managing unit configured to display the reading mode correlated with the copied data stored in the memory, and configured to read and output the copied data stored in the memory correlated with the reading mode when the reading mode is selected from the display, wherein the processing unit has a document pressing unit configured to press a document manually placed on a read position, wherein the reading mode corresponds to the document pressed against the read position, and wherein the reading mode further corresponds to an open/close action of said document pressing unit.

* * * * *